(12) United States Patent
Ganor (10) Patent No.: US 11,693,812 B2
(45) Date of Patent: Jul. 4, 2023

(54) MULTI-HOST NETWORKING SYSTEMS AND METHODS

(71) Applicant: MELLANOX TECHNOLOGIES, LTD., Yokneam (IL)

(72) Inventor: Avraham Ganor, Shoham (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 175 days.

(21) Appl. No.: 17/183,552

(22) Filed: Feb. 24, 2021

(65) Prior Publication Data

US 2022/0269639 A1 Aug. 25, 2022

(51) Int. Cl.
*G06F 13/42* (2006.01)
*G06F 13/38* (2006.01)
*G06F 13/40* (2006.01)

(52) U.S. Cl.
CPC ........ *G06F 13/4221* (2013.01); *G06F 13/385* (2013.01); *G06F 13/4063* (2013.01); *G06F 2213/0024* (2013.01)

(58) Field of Classification Search
CPC .............. G06F 13/4221; G06F 13/385; G06F 13/4063; G06F 2213/0024
See application file for complete search history.

(56) References Cited

U.S. PATENT DOCUMENTS

| | | | |
|---|---|---|---|
| 7,046,668 B2 | 5/2006 | Pettey et al. | |
| 7,103,064 B2 | 9/2006 | Pettey et al. | |
| 7,457,906 B2 | 11/2008 | Pettey et al. | |
| 7,493,416 B2 | 2/2009 | Pettey | |
| 7,620,064 B2 | 11/2009 | Pettey et al. | |
| 7,620,066 B2 | 11/2009 | Pettey et al. | |
| 7,664,909 B2 | 2/2010 | Pettey | |
| 7,706,372 B2 | 4/2010 | Pettey et al. | |
| 7,782,893 B2 | 8/2010 | Pettey et al. | |
| 8,032,659 B2 | 10/2011 | Pettey | |
| 8,346,884 B2 | 1/2013 | Pettey et al. | |
| 8,913,615 B2 | 12/2014 | Pettey et al. | |
| 9,015,350 B2 | 4/2015 | Pettey | |
| 9,106,487 B2 | 8/2015 | Pettey | |
| 9,985,820 B2 | 5/2018 | Itkin | |
| 9,998,359 B2 | 6/2018 | Itkin et al. | |
| 10,148,746 B2 | 12/2018 | Itkin et al. | |
| 10,387,358 B2 | 8/2019 | Oved | |
| 10,831,694 B1 | 11/2020 | Ganor et al. | |
| 11,093,426 B1* | 8/2021 | Giffen | G06F 13/4027 |

(Continued)

*Primary Examiner* — Henry Tsai
*Assistant Examiner* — Aurangzeb Hassan
(74) *Attorney, Agent, or Firm* — Sheridan Ross P.C.

(57) ABSTRACT

Systems and method are provided. An illustrative system includes a first compute node having a first processing unit, a first compute node port, and a first peripheral component interconnect bus configured to carry data between the first processing unit and the first compute node port. The system may further include a multi-host network interface controller having a first multi-host port, where the first multi-host port is configured to connect with the first compute node port via a first peripheral component interconnect cable, a network port, where the network port is configured to receive a network interface of a networking cable, and processing circuitry configured to translate and carry data between the first multi-host port and the network port.

17 Claims, 4 Drawing Sheets

(56) References Cited

U.S. PATENT DOCUMENTS

| | | | |
|---|---|---|---|
| 2002/0013858 A1* | 1/2002 | Anderson | H04L 12/2856 709/230 |
| 2010/0064070 A1* | 3/2010 | Yoshimura | G06F 13/128 710/22 |
| 2011/0185370 A1 | 7/2011 | Tamir et al. | |
| 2014/0129741 A1 | 5/2014 | Shahar et al. | |
| 2017/0052916 A1* | 2/2017 | Kollu | G06F 13/4022 |
| 2018/0213669 A1* | 7/2018 | Kochukunju | H05K 7/1488 |
| 2019/0042506 A1* | 2/2019 | Devey | H04L 63/20 |
| 2019/0116241 A1* | 4/2019 | Bonomi | H04L 67/62 |
| 2019/0261536 A1* | 8/2019 | Winkel | H05K 7/20763 |
| 2020/0177525 A1* | 6/2020 | Morris | H04L 41/0681 |
| 2020/0409739 A1* | 12/2020 | Kamath | H04L 45/3065 |
| 2021/0089239 A1* | 3/2021 | Liguori | G06F 3/067 |
| 2021/0271537 A1* | 9/2021 | Gong | G06F 13/4282 |
| 2021/0397448 A1* | 12/2021 | Ramesh | G06F 13/124 |

* cited by examiner

MULTI-HOST NETWORKING SYSTEMS AND METHODS

FIELD OF THE DISCLOSURE

The present disclosure is generally directed toward networking and, in particular, toward multi-host networking solutions.

BACKGROUND

Many currently-available servers are built in a configuration where multiple compute node elements are confined in a common space and share certain resources between nodes (e.g., power, space, and thermal control resources). While the compute nodes share power, space, and/or thermal control resources, the compute nodes typically each communicate independently with a Top Of Rack (TOR) switch. As the compute nodes operate at higher speeds and utilize more energy, the compute nodes will generate more heat, making the overall density of the enclosure box difficult to manage. It is especially difficult to integrate more compute nodes in the common space without negatively impacting the other compute nodes already in the common space.

BRIEF SUMMARY

In line with the challenges mentioned above, system designers are struggling to integrate the High-performance Network Interface Controller (NIC) cards in the regular manner of a standard half-height, half-length Peripheral Component Interconnect express (PCIe) card, populating the available slot. It is particularly difficult to introduce additional NIC cards because such introductions increase the speed of the system fans to the maximum limit allowed to enable sufficient cooling conditions. Unfortunately, when operating at maximum speeds, the noise introduced by the fans often disrupts signal transmission within the server enclosure.

Many modern servers are built in a constellation enclosure of a 2U box including four network hosts (e.g., computing nodes). These servers, and similar implementations, may be very dense requiring advanced thermal solutions that can be very complicated and costly if fan noise is desired to be kept below a particular threshold.

In many existing solutions, a compute node is communicating with its environment using a standard PCIe NIC that is connected to the TOR switch, connecting the rack to the rest of the network parts. This connection between the compute node and TOR switch utilizes PCIe communication standards/protocols and requires the TOR switch to have a dedicated port for each compute node in the rack. Since the compute node is a stand-alone entity and it needs to be served as such, it contains its own NIC card and connects directly to the TOR.

In some cases, an enclosure might aggregate several compute nodes to a single unit thus enabling the sharing of certain resources between the nodes. This resource sharing occurs primarily with respect to power, space, and thermal resources. Network resources are not commonly shared between compute nodes. Embodiments of the present disclosure propose a system in method in which network resources are shared between multiple compute nodes, while still enabling full serviceability of the compute node as a stand-alone entity.

More specifically, embodiments of the present disclosure propose a multi-host NIC that will enable sharing of the network resources between multiple compute nodes while still keeping the compute nodes as a stand-alone entity within the enclosure unit, thus enabling independent serviceability of each compute node.

A multi-host NIC card is proposed that includes, in addition to a network port, several external multi-host port connectors. In some embodiments, each of the multi-host port connectors (also referred to herein as multi-host ports) may enable connectivity and communication with the other compute nodes residing in the same enclosure as the multi-host NIC. One, some, or all of the compute nodes may further include an auxiliary card having a re-timer unit (e.g., a PCIe re-timer unit) enabling the routing of a PCIe bus out of the compute node to an external peripheral component interconnect cable (e.g., an External PCIe Bus connector).

In some embodiments, each of the compute nodes may be provided with an auxiliary card, then each of the compute nodes can reside in a common server enclosure with the proposed multi-host NIC. The multi-host NIC may be configured as a networking tray or blade to fit the structure of the server enclosure. Peripheral component interconnect cables may then attach each of the auxiliary cards to the multi-host NIC, thereby enabling connectivity and communications between the compute nodes and multi-host NIC.

The multi-host NIC can then be connected to the TOR switch of a server rack. In some embodiments, all communications between the TOR switch and each of the compute nodes flows through the multi-host NIC. More specifically, all communications between the compute nodes and a broader communication network may flow through a single port of the TOR switch.

An example server enclosure may include four (4) compute nodes as well as a network tray or network blade that includes the proposed multi-host NIC. As mentioned above, each of the compute nodes may incorporate an auxiliary card instead of a dedicated NIC card as in previous server configurations. The auxiliary cards can be connected to the multi-host NIC, which is directly connected to only one TOR switch port. In this configuration, the compute nodes share a common network resource of the server rack (e.g., the multi-host NIC and/or a TOR switch port). The proposed configuration is also useful for the overall performance of the compute nodes in the server enclosure because the compute nodes can be synchronized (e.g., through operations of the multi-host NIC). For instance, because the proposed multi-host NIC is used by multiple compute nodes, the compute nodes can operate at higher speeds and bandwidth, thereby enabling the resources contained in the server enclosure to accommodate higher bursts of network bandwidth. Moreover, since a single TOR switch port is used, it becomes possible to implement a dual-port NIC, again enabling higher network bandwidth.

In an illustrative example, a system is disclosed that includes: a first compute node, including: a first processing unit; a first compute node port; and a first peripheral component interconnect bus configured to carry data between the first processing unit and the first compute node port. The system is disclosed to further include a multi-host network interface controller, including: a first multi-host port, where the first multi-host port is configured to connect with the first compute node port via a first peripheral component interconnect cable; a network port, where the network port is configured to receive a network interface of a networking cable; and processing circuitry configured to translate and carry data between the first multi-host port and the network port.

In another example, a server enclosure is disclosed that includes: a first compute node, including: a first auxiliary card; a first processing unit; a first compute node port; and a first peripheral component interconnect bus configured to carry data between the first processing unit and the first compute node port. The server enclosure is further disclosed to include a multi-host network interface controller, including: a first multi-host port, where the first multi-host port is configured to connect with the first compute node port via a first peripheral component interconnect cable; a network port, where the network port is configured to receive a network interface of a networking cable; and processing circuitry configured to translate and carry data between the first multi-host port and the network port.

In yet another example, a method is disclosed that includes: mounting a multi-host network interface controller in a server enclosure, where the multi-host network interface controller comprises a first multi-host port, where the first multi-host port is configured to connect with a first compute node port of a first compute node via a first peripheral component interconnect cable, where the multi-host network interface controller further comprises a network port configured to receive a network interface of a networking cable, and where the multi-host network interface controller further comprises processing circuitry configured to translate and carry data between the first multi-host port and the network port; mounting a first auxiliary card in the server enclosure, where the first auxiliary card comprises the first compute node, and where the first auxiliary card comprises a first peripheral component interconnect bus configured to carry data between a first processing unit and the first compute node port; enabling data flows between the first auxiliary card and the multi-host network interface controller via a first communication protocol; and enabling data flows between the multi-host network interface controller and a communication network via a second communication protocol, thereby facilitating communications between the first auxiliary card and the communication network.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Figure 1A:
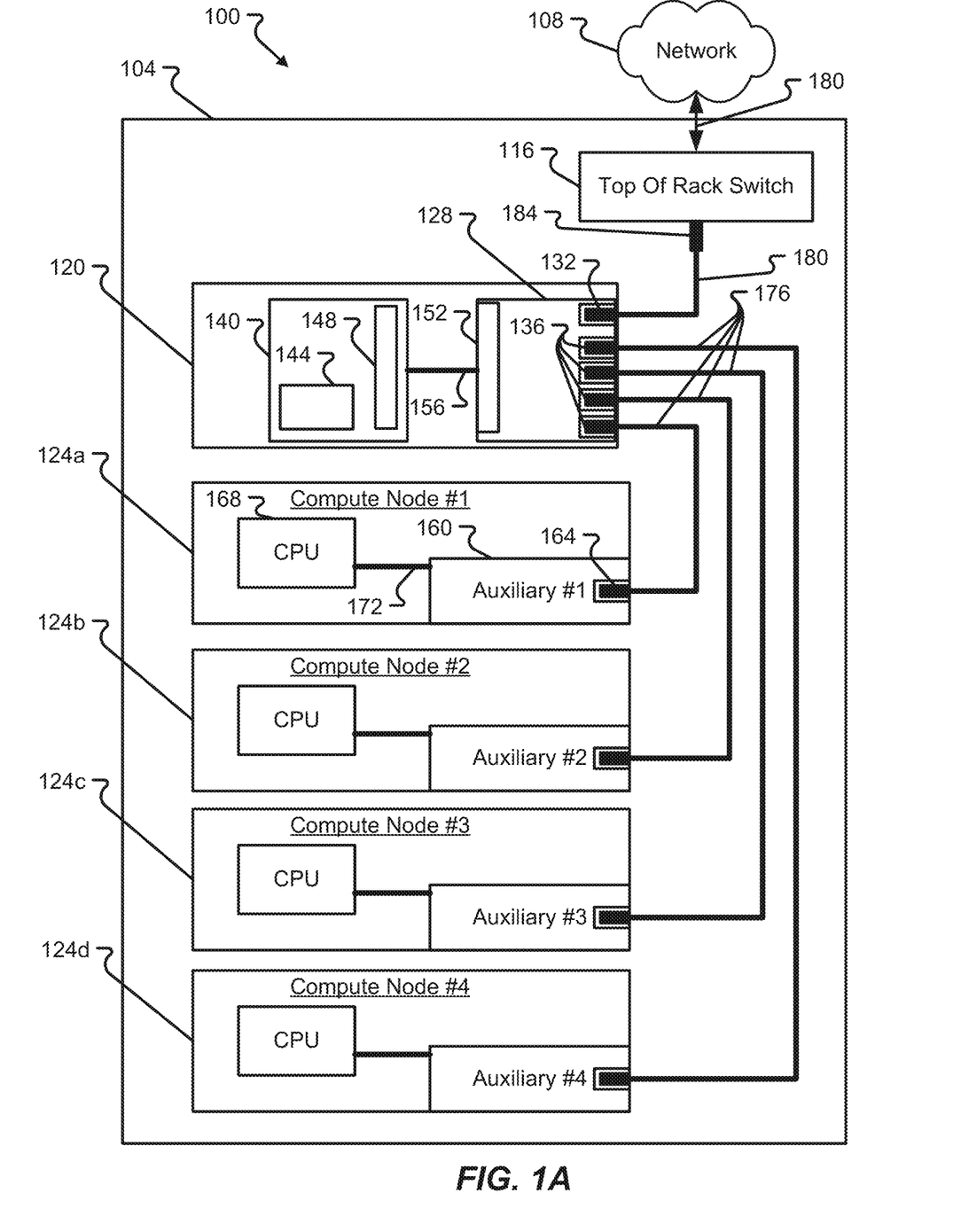
FIG. 1A is a block diagram depicting an illustrative configuration of a system in accordance with at least some embodiments of the present disclosure.
Figure 1B:
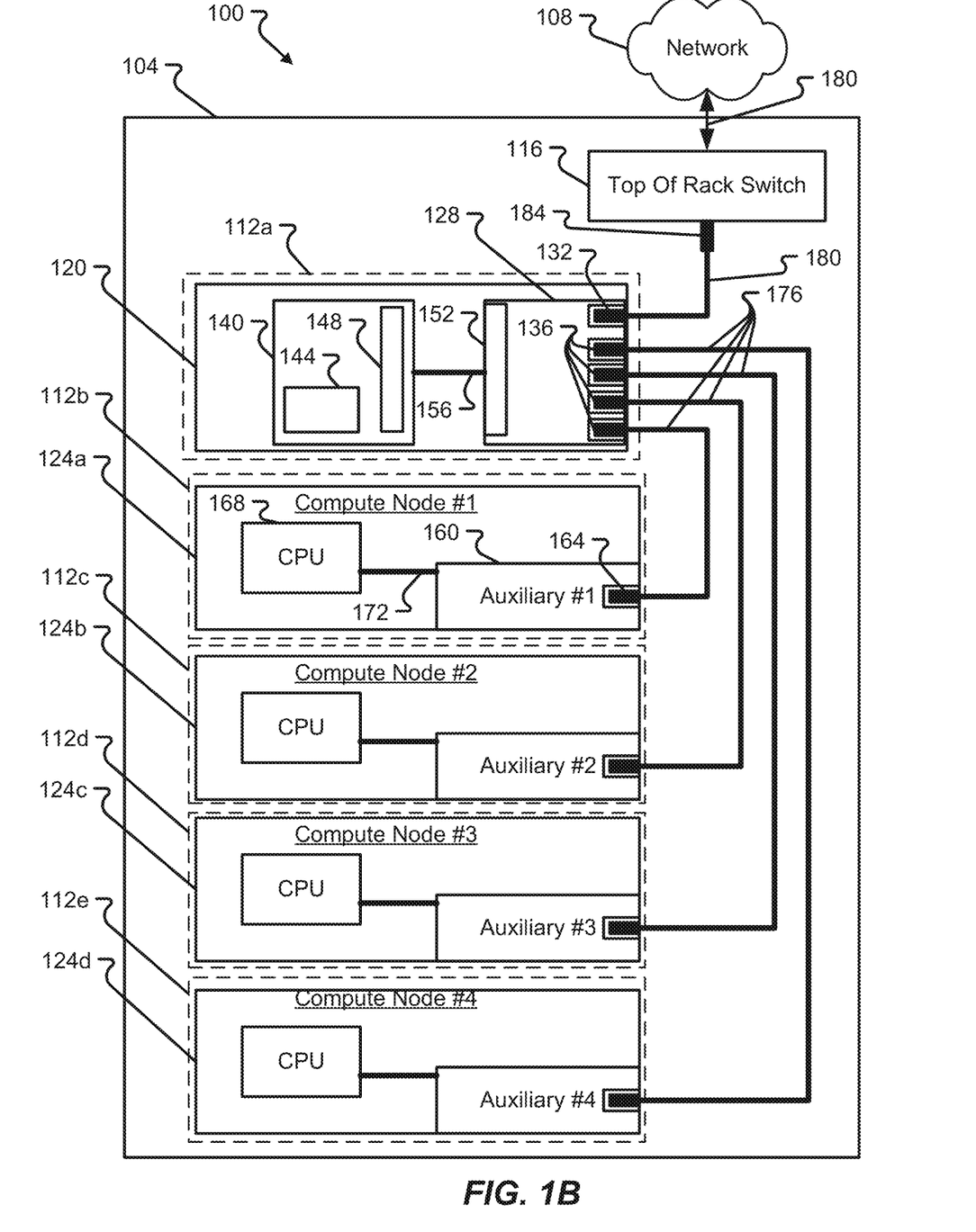
FIG. 1B is a block diagram depicting another illustrative configuration of a system in accordance with at least some embodiments of the present disclosure.
Figure 2:
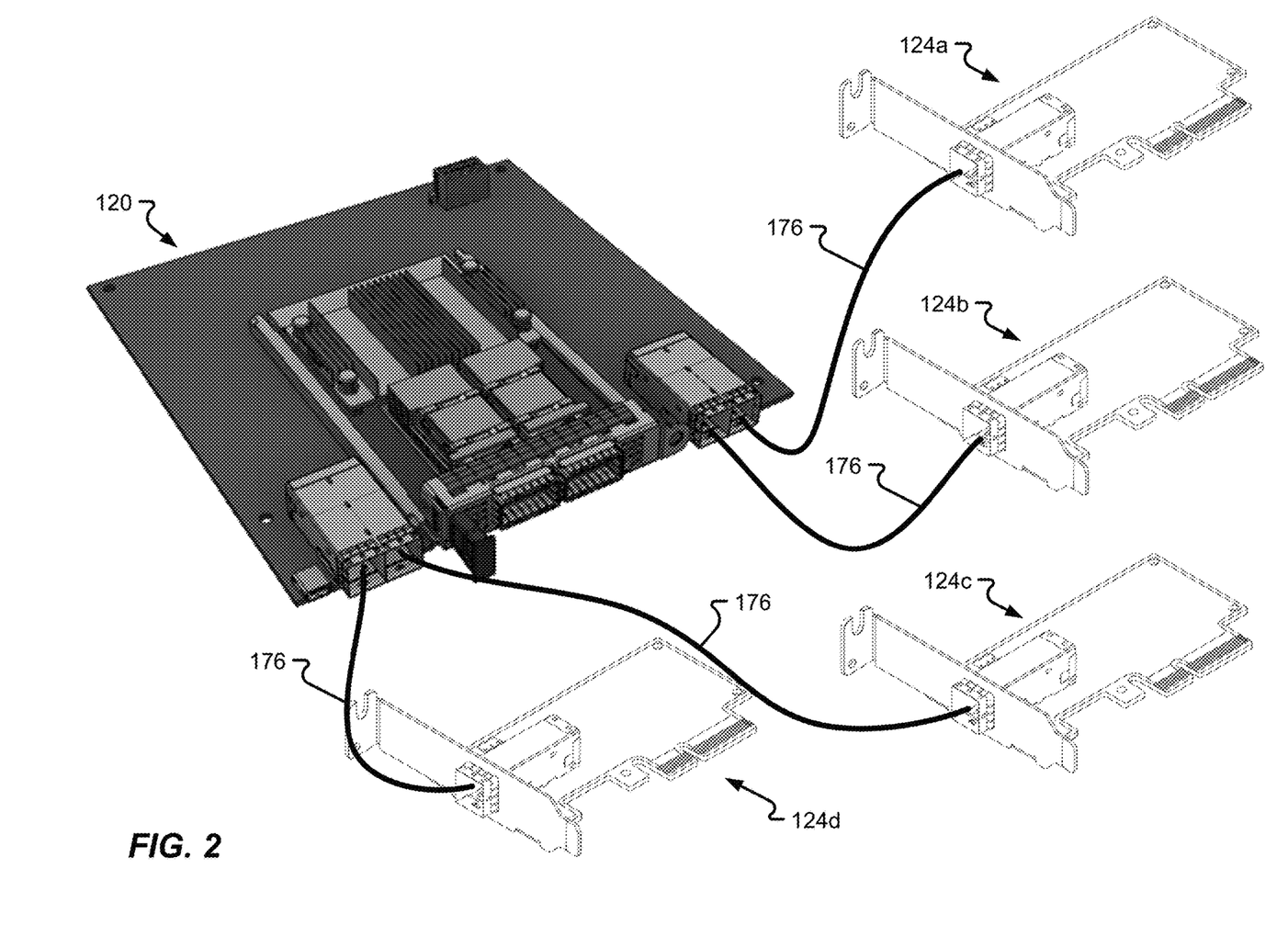
FIG. 2 is a perspective view of a multi-host NIC being connected with multiple compute nodes in accordance with at least some embodiments of the present disclosure.
Figure 3:
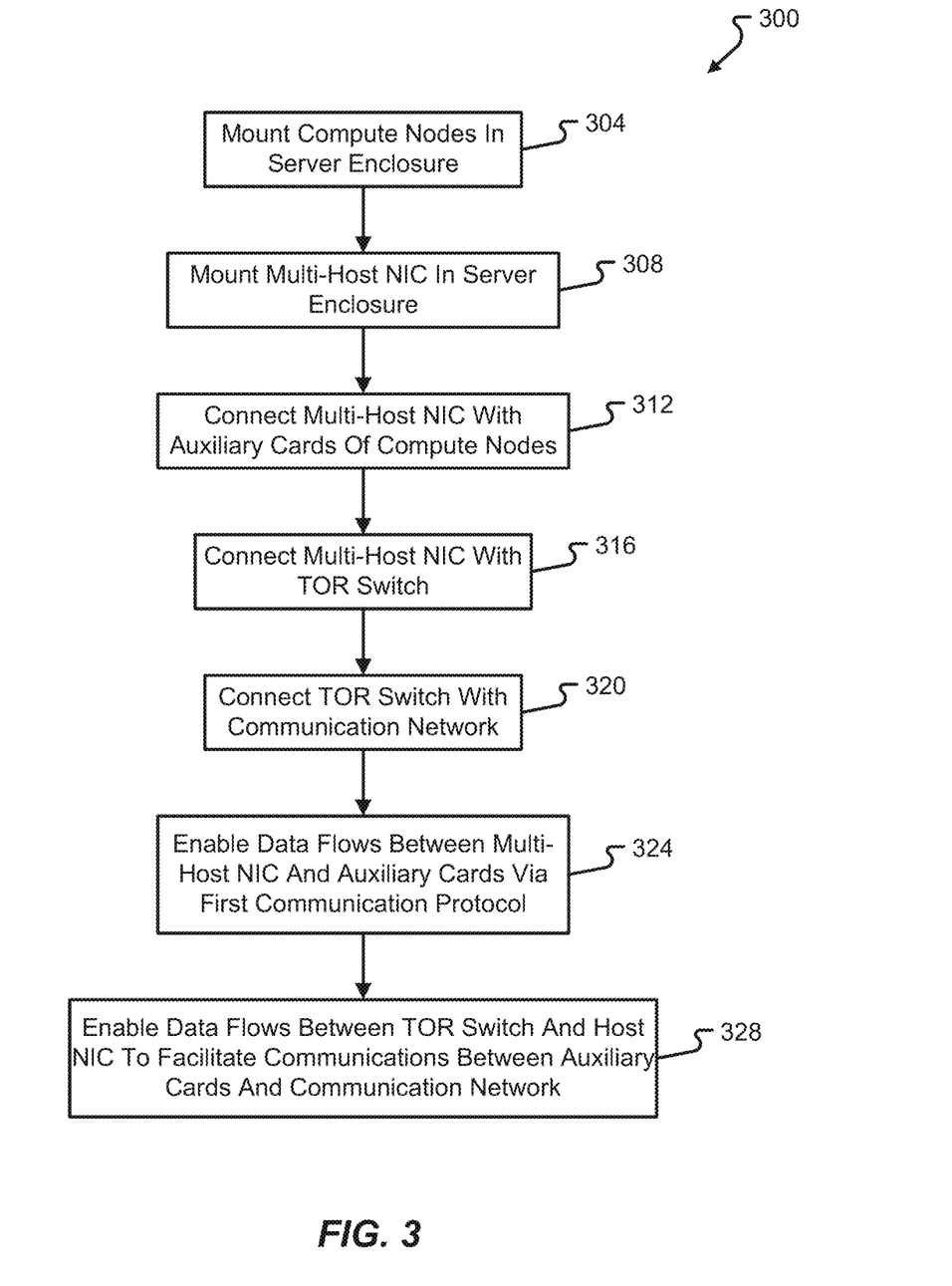
FIG. 3 is a flow diagram depicting a method of configuring a system to utilize a multi-host NIC in accordance with at least some embodiments of the present disclosure.

Referring now to FIGS. 1-3, various systems and methods for operating a server enclosure with a multi-host NIC will be described in accordance with at least some embodiments of the present disclosure. The multi-host NIC may be configured to operate on, translate, and/or route data flows between components of a server enclosure and other networking resources of a server rack. For instance, the multi-host NIC depicted and described herein may be configured to facilitate data packet transfers between multiple compute nodes and a port of a TOR switch. While certain embodiments will be described in connection with packet transmission or in connection with using certain communication protocols to carry packets from one computing device to another, it should be appreciated that embodiments of the present disclosure are not so limited. The term packet as used herein should be construed to mean any suitable discrete amount of digitized information and the multi-host NIC described herein can be configured to operate on any such digitized information.

Referring initially to FIGS. 1A and 1B, an illustrative system 100 is shown in accordance with at least some embodiments of the present disclosure. The system 100 may include a server rack 104 having one or cards that include a multi-host NIC 120 and one or many auxiliary cards 124a-d provided therein. As shown in FIG. 1A, the cards 120, 124a-d may be provided as separate entities or components within the server rack 104. As a non-limiting example, as shown in FIG. 1B, each card 120 may be provided in a different server enclosure 112a-d. Illustratively, a first server enclosure 112a may include the multi-host NIC 120, the second server enclosure 112b may include an auxiliary card 160 belonging to a first compute node 124a, the third server enclosure 112c may include an auxiliary card 160 belonging to a second compute node 124b, the fourth server enclosure 112d may include an auxiliary card 160 belonging to a third compute node 124c, and the fifth server enclosure 112e may include an auxiliary card 160 belonging to a fourth compute node 124d. Thus, the different compute nodes 124a-d and multi-host NIC 120 may be provided as separate components, which may be held in the server rack 104 by independent server enclosures 112a-e.

The first server enclosure 112a may be configured to connect to a communication network 108 via one or more networking cables 180. In some embodiments, the first server enclosure 112a may connect to a connector plug 184 or port of a TOR switch 116 with a first networking cable 180. A second networking cable 180 may then connect the TOR switch 116 to a broader communication network 108. In some embodiments, the networking cable 180 may correspond to an Ethernet® cable or any other physical device used to carry electrical and/or optical signals. It should be appreciated that the networking cable 180 used within the server rack 104 does not necessarily need to be the same type of networking cable as the one used to connect the TOR switch 116 to the communication network 108. For instance, one of the networking cables 180 may carry optical signals where the other of the networking cables 180 may carry electrical signals. The type of networking cable 180 used outside of the first server enclosure 112a may depend upon the nature of the communication network 108. For instance, if the communication network 108 is a packet-based communication network (e.g., a communication network that uses the Internet Protocol (IP) or similar packet-based communication protocol), then the networking cable(s) 180 may be configured to support the communication protocol of the communication network 108.

Additional capabilities and details of a suitable multi-host NIC 120 that may be used in accordance with at least some embodiments of the present disclosure are described in U.S. Pat. No. 10,831,694, the entire contents of which are hereby incorporated herein by reference.

The connector plug 184 of the TOR switch 116 may correspond to a physical, mechanical, electrical, and/or optical interconnect that enables the networking cable 180 to physically plug into the TOR switch 116 as well as connect (electrically and/or optically) with components of the TOR switch 116. Illustratively, but without limitation, the connector plug 184 may correspond to an Ethernet port, fiber optic port, or the like.

The first server enclosure 112a (or multi-host NIC 120 provided in the first server enclosure 112a) may further include a network port 132 that receives the opposite side of the networking cable 180. In some embodiments, the network port 132 may be responsible for carrying all communication/packets that pass between the multi-host NIC 120 and TOR switch 116. The physical, mechanical, optical, and/or electrical features of the network port 132 may be (but are not required to be) similar or identical to those of the connector plug 184, thereby enabling use of a networking cable 180 with common interfaces on both of its ends.

Although the system 100 is shown to include four compute nodes 124a-d, it should be appreciated that a greater or lesser number of compute nodes 124a-d may be provided without departing from the scope of the present disclosure. The multi-host NIC 120 is shown to include a number of components that enable the compute nodes 124a-d to share the networking resources of the TOR switch 116. Said another way, the multi-host NIC 120 may be configured to translate and carry data between each of the compute nodes 124a-d and the network port 132, thereby facilitating communications between the compute nodes 124a-d and the communication network 108. The multi-host NIC 120 is not shown to include an auxiliary card 160 or CPU 168 whereas the compute nodes 124a-d are shown to include such features.

The multi-host NIC 120 is shown to include a plurality of multi-host ports 136 on a card 128. The card 128 may also include an edge connector 152 that connects with a bus link 156. The bus link 156 may connect with a separate mother board 140 (or similar physical support substrate) that includes a bus slot 148 and other processing circuitry. In some embodiments, the processing circuitry may be provided as a processor 144 on the mother board 140. Although not depicted it should be appreciated that the processor 144 may be provided on the card 128 rather than a separate mother board 140. Regardless of the physical configuration, the processor 144 may be configured to perform the translation and data aggregation/distribution functions described in connection with the multi-host NIC 120.

In accordance with at least some embodiments, the processor 144 may correspond to a microprocessor, Central Processing Unit (CPU), Graphics Processing Unit (GPU), Data Processing Unit (DPU), Integrated Circuit (IC) chip, Field Programmable Gate Array (FPGA), Application Specific Integrated Circuit (ASIC), combinations thereof, and the like. As will be described in further detail, the processor 144 may be configured to translate and carry data between one, some, or all of the multi-host ports 136 and the network port 132. For instance, the processor 144 may be configured to combine data arriving from a first multi-host port 136, a second multi-host port 136, a third multi-host port 136, and/or a fourth multi-host port 136 and transmit the data through the network port 132. Likewise, the processor 144 may be configured to distribute data arriving from the network port 132 between the first multi-host port 136, the second multi-host port 136, the third multi-host port 136, and/or the fourth multi-host port 136. Accordingly, the processor 144 may be configured to synchronize communications between the compute nodes 124a-d and the TOR switch 116.

Although FIGS. 1A and 1B illustrate each of the compute nodes 124a-d being connected to the TOR switch 116 through the multi-host NIC 120, it should be appreciated that one or more of the compute nodes 124a-d does not necessarily need to connect with the multi-host NIC 120 or use the features provided thereby. For instance, it is possible to connect some of the compute nodes 124a-d to the multi-host NIC 120 while other compute nodes 124a-d may connect directly to the TOR switch 116 via a different port than the connector plug 184 used to connect the TOR switch 116 with the multi-host NIC 120. In such a configuration, the multi-host NIC 120 would be responsible for managing communications between the TOR switch 116 and compute nodes 124a-d connected thereto, but not other compute nodes 124a-d that bypass the multi-host NIC 120.

In some embodiments, the network port 132 may correspond to a network connector mounted on the card 128. One or more of the multi-host ports 136 may correspond to a peripheral component bus connector receptacle (e.g., a PCIe connector receptacle). The multi-host ports 136 may provide an attachment mechanism for a peripheral component interconnect cable (e.g., a PCIe cable, a mini-SAS HD cable, etc.). Other receptacle types may be used for the multi-host ports 136 in the event that PCIe is not used. For instance, the peripheral component interconnect cable 176 and multi-host ports 136 may be configured to utilize RapidIO, InfiniBand, or the like.

The edge connector 152 of the card 128 may be used to carry data between the ports 132, 136 and the motherboard 140. In some embodiments, the edge connector 152 may connect to the bus link 156, which provides a communication pathway between the card 128 (and its component) and the mother board 140 (and its component). In some embodiments, the card 128 and motherboard 140 may be configured in a way that enables the edge connector 152 of the card 128 to be inserted into the bus slot 148 of the mother board 140. Once inserted, the edge connector 152 comes into physical and electrical contact with the bus slot 148 and the bus link 156 is established. The bus link 156 may include a PCIe link, an InfiniBand link, a RapidIO link, depending upon the type of communication protocol used to communicate between the multi-host NIC 120 and compute nodes 124a-d. Alternatively or additionally, because the networking cable 184 may correspond to a different type of cable than the peripheral component interconnect cables 176 and because the processor 144 may perform certain translation functions as described herein, the bus link 156 may also carry data according to the protocol used by the networking cable 180. In an alternative configuration, translation circuitry may reside in the card 128, which translates data at the card 128 rather than relying on the processor 144 for such translations.

FIGS. 1A and 1B further illustrate each compute node 124a-d to include an auxiliary card 160, a compute node port 164, a processor 168, and bus link 172. Although each compute node 124a-d is depicted as having the same components, it may be appreciated that one or more of the compute nodes 124a-d may have different components and/or configurations than others of the compute nodes 124a-d. For instance, one of the compute nodes 124a-d may include a CPU for a processor 168 whereas another of the compute nodes 124a-d may include a GPU, DPU, or other type of processing device for a processor 168. Other variations can be envisioned for the various compute nodes 124a-d contained in the server enclosure 112.

Illustratively, the auxiliary card 160 of a compute node 124 may include the compute node port 164. The compute node port 164 may include a similar physical, electrical, and/or optical structure as one of the multi-host ports 136 provided at the multi-host NIC 120. For instance, the compute node port 164 may include a peripheral component bus connector receptacle and/or connector plug. The compute node port 164 may be configured to interface with and terminate the peripheral component interconnect cable 176.

Although not depicted, the auxiliary card 160 may include an edge connector that enables the auxiliary card 160 to physically and electrically interface with a slot, thereby creating the bus link 172 and enabling communications between the auxiliary card 160 and processor 168. In some embodiments, the bus link 172 may be similar or identical to the bus link 156 and may correspond to a PCIe link.

The auxiliary card 160 may include additional circuitry or components to facilitate communications between the auxiliary card 160 and the multi-hot NIC 120. For instance, an auxiliary card 160 may include a PCIe re-timer unit enabling the routing of the bus link 172 (e.g., a PCIe Bus) out of the compute node 124 to the external peripheral component interconnect cable 176. In some embodiments, the re-timer unit provided in the auxiliary card 160 may include an amplifier that compensates for signal loss introduced by the bus link 172 and/or by the peripheral component interconnect cable 176.

With reference now to FIG. 2, additional mechanical details of the system 100 will be described in accordance with at least some embodiments of the present disclosure. The multi-host NIC 120 is shown to be provided on a substrate that can be mounted (e.g., by screws, fasteners, or the like) to a server enclosure (e.g., the first server enclosure 112a).

As mentioned above, the each of the multi-host NIC 120 and compute nodes 124a-d may be provided within a server rack 104 on separate server enclosures 112a-e. Providing the multi-host NIC 120 and each compute node 124a-d on a separate server enclosure 112a-e may also enable different compute nodes 124a-d to be switched in and out of the server rack 104 with little impact on the other components of the system 100.

With reference now to FIG. 3, an illustrative method 300 will be described in accordance with at least some embodiments of the present disclosure. It should be appreciated that certain steps depicted and described herein can be performed in parallel with one another or in any suitable order, which may or may not correspond to the order of operations depicted in FIG. 3.

The method 300 begins by mounting one or more compute nodes 124a-d onto separate server enclosures (e.g., server enclosures 112b-e) (step 304). In some embodiments, this step may involve sliding or inserting the compute nodes 124a-d into slots of an enclosure body.

The method 300 continues by mounting a multi-host NIC 120 onto a server enclosure 112 (e.g., server enclosure 112a) (step 308). In some embodiments, this step may involve fastening the multi-hots NIC 120 to an appropriate receptacle of a server enclosure body.

The method 300 may then continue by connecting the multi-host NIC 120 with auxiliary cards 160 of one or more of the compute nodes 124a-d (step 312). For instance, an external peripheral component interconnect cable 176 may be connected on one end to a multi-host port 136 of the multi-host NIC 120 and the other end of the external peripheral component interconnect cable 176 may be connected to a compute node port 164 of an auxiliary card 160.

After connections have been established between the compute nodes 124*a-d* and the multi-host NIC 120, the method 300 may further continue by connecting the multi-host NIC 120 with a TOR switch 116 (step 316). In some embodiments, the multi-host NIC 120 may be connected with the TOR switch 116 by connecting a first end of a networking cable 180 to the network port 132 of the multi-hots NIC 120 and a second end of the networking cable 180 to a connector plug 184 (e.g., a port) of the TOR switch 116.

The TOR switch 116 may then be connected with a communication network 108 (step 320). The TOR switch 116 may have already been connected with the communication network 108 if the server rack 104 was already housing other operational servers or server enclosures.

Once all appropriate connections and cables have been established, the method 300 may continue by enabling data flows (e.g., packets transmissions) between the multi-host NIC 120 and the auxiliary cards 160 of the various compute nodes 124*a-d* (step 324). The communications between the multi-host NIC 120 and compute nodes 124*a-d* may be facilitated by a first communication protocol (e.g., PCIe, InfiniBand, RapidIO, etc.). The method 300 may also include enabling data flows between the TOR switch 116 and the multi-hots NIC 120 to facilitate communications between the compute nodes 124*a-d* and the communication network 108 (step 328). In some embodiments, the communications between TOR switch 116 and multi-host NIC 120 may be facilitated using a different communication protocol than the one used between the compute nodes 124*a-d* and multi-host NIC 120. For instance, an Ethernet® cable may be used to connect the multi-host NIC 120 with the TOR switch 116 and a communication protocol other than PCIe, InfiniBand, or RapidIO may be used between the multi-host NIC 120 and TOR switch 116 and/or between the TOR switch 116 and the communication network 108.

In some embodiments, steps 324 and 328 may include enabling the multi-host NIC 120 to translate and carry data between the multi-host ports 136 and the communication network 108. The steps may alternatively or additionally include enabling the multi-host NIC 120 to combine data arriving from the multiple multi-host ports 136 and transmit the combined data through the network port 132. The steps may alternatively or additionally include enabling the multi-host NIC 120 to distribute data arriving from the network port 132 between the various multi-host ports 136.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
    a first compute node, comprising:
        a first processing unit;
        a first compute node port; and
        a first peripheral component interconnect bus configured to carry data between the first processing unit and the first compute node port;
    a multi-host network interface controller, comprising:
        a first multi-host port, wherein the first multi-host port is configured to connect with the first compute node port via a first peripheral component interconnect cable;
        a network port, wherein the network port is configured to receive a network interface of a networking cable;
        a second multi-host port; and
        processing circuitry configured to translate and carry data between the first multi-host port and the network port; and
    a second compute node, comprising:
        a second processing unit;
        a second compute node port, wherein the second multi-host port is configured to connect with the second compute node port via a second peripheral component interconnect cable; and
        a second peripheral component interconnect bus configured to carry data between the second processing unit and the second compute node port, wherein the processing circuitry is configured to translate and carry data between the second multi-host port and the network port and wherein the processing circuitry is further configured to combine data arriving from the first multi-host port and second multi-host port and transmit the combined data through the network port.

2. The system of claim 1, wherein the processing circuitry is configured to translate and carry data between the second multi-host port and the network port and wherein the processing circuitry is further configured to distribute data arriving from the network port between the first multi-host port and second multi-host port.

3. The system of claim 1, further comprising:
    a top of rack (TOR) switch configured to communicate with the first compute node and the second compute node via the multi-host network interface controller.

4. The system of claim 3, wherein the TOR switch comprises a TOR network port configured to receive a second network interface of the networking cable and wherein communications between the TOR switch and the multi-host network interface controller are carried by the networking cable.

5. The system of claim 3, wherein the TOR switch is further connected to a packet-based communication network.

6. The system of claim 1, wherein the first compute node further comprises an auxiliary card, wherein the auxiliary card comprises the first compute node port, and wherein the auxiliary card connects with the first peripheral component interconnect bus via a peripheral component interconnect bus edge-connector.

7. The system of claim 6, wherein the auxiliary card further comprises a re-timer unit that routes the first peripheral component interconnect bus out of the first compute node to the first compute node port.

8. The system of claim 7, wherein the re-timer unit comprises an amplifier that compensates for signal loss introduced by the first peripheral component interconnect bus or the first peripheral component interconnect cable.

9. The system of claim 1, wherein the first processing unit comprises a Central Processing Unit (CPU) and wherein the first compute node and multi-host network interface controller are provided on separate server enclosures.

10. A system, comprising:
- a first server enclosure comprising a first compute node, wherein the first compute node comprises:
  - a first auxiliary card;
  - a first processing unit;
  - a first compute node port; and
  - a first peripheral component interconnect bus configured to carry data between the first processing unit and the first compute node port;
- a second server enclosure comprising a multi-host network interface controller, wherein the multi-host network interface controller comprises:
  - a first multi-host port, wherein the first multi-host port is configured to connect with the first compute node port via a first peripheral component interconnect cable;
  - a network port, wherein the network port is configured to receive a network interface of a networking cable;
  - a second multi-host port; and
  - processing circuitry configured to translate and carry data between the first multi-host port and the network port; and
- a third server enclosure comprising a second compute node, wherein the second compute node comprises:
  - a second auxiliary card;
  - a second processing unit;
  - a second compute node port, wherein the second multi-host port is configured to connect with the second compute node port via a second peripheral component interconnect cable; and
  - a second peripheral component interconnect bus configured to carry data between the second processing unit and the second compute node port, wherein the processing circuitry is configured to translate and carry data between the second multi-host port and the network port and wherein the processing circuitry is further configured to combine data arriving from the first multi-host port and second multi-host port and transmit the data through the network port.

11. The system of claim 10, wherein the first auxiliary card includes the first compute node port and wherein the second auxiliary card includes the second compute node port.

12. The system of claim 10, wherein the processing circuitry is configured to translate and carry data between the second multi-host port and the network port and wherein the processing circuitry is further configured to distribute data arriving from the network port between the first multi-host port and second multi-host port.

13. The system of claim 10, wherein the first auxiliary card comprises a re-timer unit that routes the first peripheral component interconnect bus out of the first compute node to the first compute node port.

14. The system of claim 13, wherein the re-timer unit comprises an amplifier that compensates for signal loss introduced by the first peripheral component interconnect bus or the first peripheral component interconnect cable.

15. A method, comprising:
- mounting a multi-host network interface controller on a first server enclosure, wherein the multi-host network interface controller comprises a first multi-host port, wherein the first multi-host port is configured to connect with a first compute node port of a first compute node via a first peripheral component interconnect cable, wherein the multi-host network interface controller further comprises a network port configured to receive a network interface of a networking cable, and wherein the multi-host network interface controller further comprises processing circuitry configured to translate and carry data between the first multi-host port and the network port;
- mounting a first auxiliary card on a second server enclosure, wherein the first auxiliary card comprises the first compute node, and wherein the first auxiliary card comprises a first peripheral component interconnect bus configured to carry data between a first processing unit and the first compute node port;
- enabling data flows between the first auxiliary card and the multi-host network interface controller via a first communication protocol;
- enabling data flows between the multi-host network interface controller and a communication network via a second communication protocol, thereby facilitating communications between the first auxiliary card and the communication network;
- mounting a second auxiliary card on a third server enclosure, wherein the second auxiliary card comprises a second compute node, and wherein the second auxiliary card comprises a second peripheral component interconnect bus configured to carry data between a second processing unit and a second compute node port;
- connecting the second compute node port with a second multi-host port of the multi-host network interface controller;
- enabling the multi-host network interface controller to translate and carry data between the second multi-host port and the communication network;
- enabling the multi-host network interface controller to combine data arriving from the first multi-host port and second multi-host port and transmit the combined data through the network port; and
- enabling the multi-host network interface controller to: (i) distribute data arriving from the network port between the first multi-host port and second multi-host port and/or (ii) combine data arriving from the first multi-host port and the second multi-host port for transmission through the network port.

16. A system, comprising:
- a first compute node, comprising:
  - a first processing unit;
  - a first compute node port; and
  - a first peripheral component interconnect bus configured to carry data between the first processing unit and the first compute node port;
- a multi-host network interface controller, comprising:
  - a first multi-host port, wherein the first multi-host port is configured to connect with the first compute node port via a first peripheral component interconnect cable;
  - a network port, wherein the network port is configured to receive a network interface of a networking cable;
  - a second multi-host port; and
  - processing circuitry configured to translate and carry data between the first multi-host port and the network port; and
- a second compute node, comprising:
  - a second processing unit;
  - a second compute node port, wherein the second multi-host port is configured to connect with the second compute node port via a second peripheral component interconnect cable; and
  - a second peripheral component interconnect bus configured to carry data between the second processing unit and the second compute node port, wherein the processing circuitry is configured to translate and carry data between the second multi-host port and the network port and wherein the processing circuitry is further configured to distribute data arriving from the network port between the first multi-host port and second multi-host port.

17. A system, comprising:
a first server enclosure comprising a first compute node, wherein the first compute node comprises:
  a first auxiliary card;
  a first processing unit;
  a first compute node port; and
  a first peripheral component interconnect bus configured to carry data between the first processing unit and the first compute node port;
a second server enclosure comprising a multi-host network interface controller, wherein the multi-host network interface controller comprises:
  a first multi-host port, wherein the first multi-host port is configured to connect with the first compute node port via a first peripheral component interconnect cable;
  a network port, wherein the network port is configured to receive a network interface of a networking cable;
  a second multi-host port; and
  processing circuitry configured to translate and carry data between the first multi-host port and the network port; and
a third server enclosure comprising a second compute node, wherein the second compute node comprises:
  a second auxiliary card;
  a second processing unit;
  a second compute node port, wherein the second multi-host port is configured to connect with the second compute node port via a second peripheral component interconnect cable; and
  a second peripheral component interconnect bus configured to carry data between the second processing unit and the second compute node port, wherein the processing circuitry is configured to translate and carry data between the second multi-host port and the network port and wherein the processing circuitry is further configured to distribute data arriving from the network port between the first multi-host port and second multi-host port.

* * * * *